US008921249B2

(12) United States Patent
Tohma et al.

(10) Patent No.: US 8,921,249 B2
(45) Date of Patent: Dec. 30, 2014

(54) METHOD FOR PRODUCING POROUS ALUMINUM MAGNESIUM TITANATE AND POROUS ALUMINUM MAGNESIUM TITANATE

(75) Inventors: Tetsuro Tohma, Niihama (JP); Kentaro Iwasaki, Niihama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 85 days.

(21) Appl. No.: 13/583,115

(22) PCT Filed: Mar. 4, 2011

(86) PCT No.: PCT/JP2011/055119
§ 371 (c)(1),
(2), (4) Date: Nov. 13, 2012

(87) PCT Pub. No.: WO2011/111633
PCT Pub. Date: Sep. 15, 2011

(65) Prior Publication Data
US 2013/0048905 A1 Feb. 28, 2013

(30) Foreign Application Priority Data

Mar. 8, 2010 (JP) .................................. 2010-050293

(51) Int. Cl.
| C04B 35/00 | (2006.01) |
| C04B 38/06 | (2006.01) |
| C04B 35/478 | (2006.01) |
| C04B 35/634 | (2006.01) |
| C04B 111/00 | (2006.01) |

(52) U.S. Cl.
CPC ........... *C04B 38/0645* (2013.01); *C04B 35/478* (2013.01); *C04B 35/63488* (2013.01); *C04B 2111/00793* (2013.01); *C04B 2235/3206* (2013.01); *C04B 2235/3217* (2013.01); *C04B 2235/3218* (2013.01); *C04B 2235/322* (2013.01); *C04B 2235/3232* (2013.01); *C04B 2235/36* (2013.01); *C04B 2235/3852* (2013.01); *C04B 2235/3886* (2013.01); *C04B 2235/401* (2013.01); *C04B 2235/402* (2013.01); *C04B 2235/404* (2013.01); *C04B 2235/428* (2013.01); *C04B 2235/44* (2013.01); *C04B 2235/441* (2013.01); *C04B 2235/442* (2013.01); *C04B 2235/443* (2013.01); *C04B 2235/444* (2013.01); *C04B 2235/446* (2013.01); *C04B 2235/447* (2013.01); *C04B 2235/448* (2013.01); *C04B 2235/449* (2013.01); *C04B 2235/5436* (2013.01); *C04B 2235/5463* (2013.01); *C04B 2235/661* (2013.01); *C04B 2235/79* (2013.01); *C04B 2235/3418* (2013.01); *C04B 2235/5445* (2013.01); *C04B 2235/6584* (2013.01)
USPC ........................................... 501/136; 501/134

(58) Field of Classification Search
CPC .... C04B 35/46; C04B 35/495; C04B 35/465; C04B 35/195; C04B 35/66; H01B 3/12
USPC .................................. 501/134, 136, 118, 119
See application file for complete search history.

(56) References Cited

U.S. PATENT DOCUMENTS

| 5,008,222 | A | 4/1991 | Kameda |
| 2006/0009347 | A1 | 1/2006 | Fukuda et al. |
| 2007/0059484 | A1 | 3/2007 | Fukuda et al. |
| 2007/0224110 | A1 | 9/2007 | Fukuda et al. |
| 2010/0044911 | A1 | 2/2010 | Suwabe et al. |
| 2010/0310819 | A1* | 12/2010 | Suwabe et al. ............ 428/116 |
| 2011/0097582 | A1* | 4/2011 | Tohma et al. ............ 428/402 |
| 2012/0034446 | A1 | 2/2012 | Tohma et al. |

FOREIGN PATENT DOCUMENTS

| EP | 0285312 A2 | 10/1988 | |
| JP | 57-3767 A | 1/1982 | |
| JP | 2007-105622 A | 4/2007 | |
| JP | 2009-196881 A | 9/2009 | |
| WO | 2004/039747 A1 | 5/2004 | |
| WO | 2005/005019 A1 | 1/2005 | |
| WO | 2005/105704 A1 | 11/2005 | |
| WO | 2008/078747 A1 | 7/2008 | |
| WO | 2009/063997 A1 | 5/2009 | |
| WO | WO 2009/063997 A * | 5/2009 | .............. C04B 35/46 |
| WO | 2009/093560 A1 | 7/2009 | |
| WO | WO 2009/093560 A * | 7/2009 | .............. C04B 35/46 |
| WO | 2010/098348 A1 | 9/2010 | |

OTHER PUBLICATIONS

First Office Action issued Aug. 5, 2013 in counterpart Chinese Patent Application No. 201180012955.3 with translation.
Notice of Reasons for Rejection issued Jul. 22, 2014 in counterpart Japanese Patent Application No. P2011-047636 with English translation.
Extended European Search Report issued Jan. 17, 2014 in counterpart European Patent Application No. 11753292.9.
Athena Tsetsekou, "A comparison study of tialite ceramics doped with various oxide materials and tialite-mullite composites: microstructural, thermal and mechanical properties", Journal of the European Ceramic Society, Elsevier Science Publishers, Barking, Essex, GB, vol. 25, No. 1, Apr. 1, 2005, pp. 335-348, XP004685805.

* cited by examiner

*Primary Examiner* — Noah Wiese
(74) *Attorney, Agent, or Firm* — Sughrue Mion, PLLC

(57) ABSTRACT

The production method of the present invention is a method for producing porous aluminum magnesium titanate by forming a mixture containing Al source powder, Mg source powder, Ti source powder and Si source powder as well as a pore-forming agent to obtain a molded body; presintering the obtained molded body; and then sintering the presintered molded body, wherein the content of the pore-forming agent to a total of 100 parts by mass for the Al source powder, Mg source powder, Ti source powder and Si source powder is 5 to 30 parts by mass, the melting point of the Si source powder is 600 to 1300° C., when the elemental composition ratio of Al, Mg, Ti and Si in the mixture is represented by compositional formula (1):

$$Al_{2(1-x)}Mg_xTi_{(1+x)}O_5 + aAl_2O_3 + bSiO_2 \qquad (1),$$

x satisfies $0.05 \leq x \leq 0.15$, a satisfies $0 \leq a \leq 0.1$ and b satisfies $0.05 \leq b \leq 0.15$, and the presintered molded body is sintered at 1300 to 1560° C.

1 Claim, No Drawings

METHOD FOR PRODUCING POROUS ALUMINUM MAGNESIUM TITANATE AND POROUS ALUMINUM MAGNESIUM TITANATE

TECHNICAL FIELD

The present invention relates to a method for producing porous aluminum magnesium titanate and porous aluminum magnesium titanate.

BACKGROUND ART

Aluminum magnesium titanate is a ceramic containing Al, Mg and Ti as constituent elements. In Patent Literatures 1, 2 and 3, a method of forming a mixture containing aluminum source powder, magnesium source powder, titanium source powder and silicon source powder to obtain a molded body, and sintering the obtained molded body is disclosed as a method for producing aluminum magnesium titanate. Specifically, when the elemental composition ratio of Al, Mg, Ti and Si in the mixture is represented by compositional formula (1):

$$Al_{2(1-x)}Mg_xTi_{(1+x)}O_5 + aAl_2O_3 + bSiO_2 \quad (1),$$

in Patent Literature 1, an example using a mixture in which x is 0.50, a is 0.01 to 0.05 and b is 0.02 to 0.25 is disclosed, in Patent Literature 2, an example using a mixture in which x is 0.25 to 0.95, a is 0.1 and b is 0.1 is disclosed, and in Patent Literature 3, an example using a mixture in which x is 0.08, a is 0.07 and b is 0.08 is disclosed. According to such a production method, aluminum source powder, magnesium source powder and titanium source powder can react with each other by sintering to obtain target aluminum magnesium titanate.

CITATION LIST

Patent Literature

Patent Literature 1: International Publication No. WO2005/105704
Patent Literature 2: International Publication No. WO2004/039747
Patent Literature 3: Japanese Patent Application Laid-Open No. 2009-196881

SUMMARY OF INVENTION

Technical Problem

Aluminum magnesium titanate is required to be porous when it is used as a filter such as a particulate filter to scavenge particulates in exhaust gas emitted from an internal-combustion engine. Examples of methods for producing porous aluminum magnesium titanate include a method of sintering after obtaining a presintered molded body by forming a mixture containing aluminum source powder, magnesium source powder, titania source powder and silicon source powder as well as a pore-forming agent to obtain a molded body, and presintering the obtained molded body to burn out the pore-forming agent. The porous aluminum magnesium titanate obtained is desired to have larger porosity. Therefore, the present inventors studied eagerly to develop a method capable of producing porous aluminum magnesium titanate having larger porosity to arrive at the present invention.

Solution to Problem

The present invention provides a method for producing porous aluminum magnesium titanate, comprising: forming a mixture containing aluminum source powder, magnesium source powder, titanium source powder and silicon source powder as well as a pore-forming agent to obtain a molded body; presintering the obtained molded body to eliminate the pore-forming agent; and then sintering the presintered molded body to react the aluminum source powder, magnesium source powder and titanium source powder, wherein the content of the pore-forming agent in the mixture relative to the total 100 parts by mass content of the aluminum source powder, magnesium source powder, titanium source powder and silicon source powder is 5 to 30 parts by mass, the melting point of the silicon source powder is 600 to 1300° C., when the elemental composition ratio of Al, Mg, Ti and Si in the mixture is represented by compositional formula (1):

$$Al_{2(1-x)}Mg_xTi_{(1+x)}O_5 + aAl_2O_3 + bSiO_2 \quad (1),$$

x satisfies $0.05 \leq x \leq 0.15$, a satisfies $0 \leq a \leq 0.1$ and b satisfies $0.05 \leq b \leq 0.15$, and the presintered molded body is sintered at 1300 to 1550° C.

The porous aluminum magnesium titanate obtained according to the production method of the present invention is porous aluminum magnesium titanate wherein it comprises an Si element, and when the elemental composition ratio of Al, Mg, Ti and Si is represented by compositional formula (1):

$$Al_{2(1-x)}Mg_xTi_{(1+x)}O_5 + aAl_2O_3 + bSiO_2 \quad (1),$$

x satisfies $0.05 \leq x \leq 0.15$, a satisfies $0 \leq a \leq 0.1$ and b satisfies $0.05 \leq b \leq 0.15$.

Advantageous Effects of Invention

According to the production method of the present invention, porous aluminum magnesium titanate having larger porosity can be produced, since x is 0.15 or less and b is 0.15 or less in compositional formula (1) for the mixture.

DESCRIPTION OF EMBODIMENTS

[Aluminum Source Powder]

Aluminum source powder used in the production method of the present invention is raw powder which becomes an aluminum component composing target porous aluminum magnesium titanate.

Examples of aluminum source powder include alumina (aluminum oxide) powder. Examples of crystal forms of alumina include α-form, γ-form, δ-form and θ-form, and alumina may be amorphous, preferably is α-form.

Aluminum source powder may be powder which is converted to alumina by sintering it alone in the air. Examples of such powder include powder of aluminum salts, aluminum alkoxide, aluminum hydroxides and metal aluminum.

Aluminum salts may be inorganic salts of aluminum and inorganic acids or organic salts of aluminum and organic acids. Examples of aluminum inorganic salts specifically include aluminum nitrates such as aluminum nitrate and aluminum ammonium nitrate; and aluminum carbonates such as aluminum ammonium carbonate. Examples of aluminum organic salts include aluminum oxalate, aluminum acetate, aluminum stearate, aluminum lactate and aluminum laurate.

Examples of aluminum alkoxides specifically include aluminum isopropoxide, aluminum ethoxide, aluminum sec-butoxide and aluminum tert-butoxide.

Examples of aluminum hydroxides specifically include ones whose crystal forms are, for example, gibbsite-form, bayerite-form, norstrandite-form, boehmite-form and pseudoboehmite-form, and they may be amorphous aluminum hydroxides. Examples of amorphous aluminum hydroxides include aluminum hydrolysates obtained by hydrolyzing solutions of water-soluble aluminum compounds such as aluminum salts and aluminum alkoxides.

Aluminum source powder is used singly or in combinations of two or more. Aluminum source powder may contain a small amount of impure ingredients which are derived from its source or incorporated inevitably in the production process.

Alumina powder is preferably used as aluminum source powder.

The particle diameter corresponding to a cumulative percentage of 50% (D50) on a volume basis of aluminum source powder is usually within the range of 20 to 60 preferably within the range of 30 to 60 μm. When D50 of aluminum source powder is within the above range, porous aluminum magnesium titanate having large porosity can be easily obtained and shrinkage in sintering can be decreased. D50 of aluminum source powder is measured by laser diffractometry.

[Titanium Source Powder]

Titanium source powder is raw powder which becomes a titanium component composing target porous aluminum magnesium titanate.

Examples of titanium source powder include titanium oxide powder. Examples of titanium oxides include titanium oxide (IV), titanium oxide (III) and titanium oxide (II), and titanium oxide (IV) is preferably used. Examples of crystal forms of titanium oxide (IV) include anatase-form, rutile-form and brookite-form, and titanium oxide (IV) may be amorphous, preferably is anatase-form or rutile-form.

Titanium source powder may be powder which is converted to titania (titanium oxide) by sintering it alone in the air. Examples of such powder include powder of titanium salts, titanium alkoxides, titanium hydroxides, titanium nitride, titanium sulfides and titanium metal.

Examples of titanium salts specifically include titanium trichloride, titanium tetrachloride, titanium sulfide (IV), titanium sulfide (VI) and titanium sulfate (IV). Examples of titanium alkoxides specifically include titanium (IV) ethoxide, titanium (IV) methoxide, titanium (IV) tert-butoxide, titanium (IV) isobutoxide, titanium (IV) n-propoxide, titanium (IV) tetraisopropoxide and chelates thereof.

Titanium source powder may be used singly or in combinations of two or more. Titanium source powder may contain a small amount of impure ingredients which are derived from its source or incorporated inevitably in the production process. Titanium oxide powder is preferably used as titanium source powder.

Though the particle diameter of titanium source powder is not particularly limited, the particle diameter corresponding to a cumulative percentage of 50% (D50) on a volume basis of titanium source powder is usually within the range of 0.1 to 25 μm and preferably within the range of 1 to 20 μm in order to decrease shrinkage in sintering. D50 of titanium source powder is measured by laser diffractometry.

[Magnesium Source Powder]

Magnesium source powder is raw powder which becomes a magnesium component composing target porous aluminum magnesium titanate.

Examples of magnesium source powder include magnesia (magnesium oxide) powder. Further, the examples also include powder which is converted to magnesia by sintering it alone in the air, for example, powder of magnesium salts, magnesium alkoxides, magnesium hydroxides, magnesium nitride and metal magnesium.

Examples of magnesium salts specifically include magnesium chloride, magnesium perchlorate, magnesium phosphate, magnesium pyrophosphate, magnesium oxalate, magnesium nitrate, magnesium carbonate, magnesium acetate, magnesium sulfate, magnesium citrate, magnesium lactate, magnesium stearate, magnesium salicylate, magnesium myristate, magnesium gluconate, magnesium dimethacrylate and magnesium benzoate.

Examples of magnesium alkoxides specifically include magnesium methoxide and magnesium ethoxide.

Magnesium source powder may be used singly or in combinations of two or more. Magnesium source powder may contain a small amount of impure ingredients which are derived from its source or incorporated inevitably in the production process.

Though the particle diameter of magnesium source powder is not particularly limited, the particle diameter corresponding to a cumulative percentage of 50% (D50) on a volume basis of magnesium source powder is usually within the range of 5 to 30 μm and preferably within the range of 3 to 20 μm in order to decrease shrinkage in sintering. D50 of magnesium source powder is measured by laser diffractometry.

[Silicon Source Powder]

The melting point of silicon source powder is 600 to 1300° C. Silicon source powder is raw powder which is in melting state on sintering and usually becomes amorphous silicon oxide component after sintering and is contained in target aluminum magnesium titanate.

Examples of silicon source powder having the above melting point include glass frit. Glass frit is glass in the form of flakes or powder, which contains silicic acid [$SiO_2$] as a main component, i.e. at not less than 50% by mass of all the components, and contain other components, for example, alumina [$Al_2O_3$], sodium oxide [$Na_2O_3$], potassium oxide [$K_2O$], calcium oxide [$CaO$], magnesia [$Mg_2O$] and zirconia [$ZrO_2$]. Glass frit is obtained by, for example, grinding a glass mass. The more the content of the components other than silicic acid is, the lower melting point the glass frit has.

Though the particle diameter of silicon source powder is not particularly limited, the particle diameter corresponding to a cumulative percentage of 50% (D50) on a volume basis of silicon source powder is usually within the range of 0.5 μm or more and 30 μm or less, and preferably within the range of 1 μm or more and 20 μm or less. D50 of silicon source powder is measured by laser diffractometry.

[Pore-Forming Agent]

Examples of pore-forming agents include carbon materials such as graphite; resins such as polyethylene, polypropylene and polymethylmethacrylate; and plant materials such as starch, nut shell, walnut shell and corn. Examples of the starch in the above plant materials include corn starch, barley starch, wheat starch, tapioca starch, potato starch, bean starch, rice starch, pea starch, sago starch and canna starch.

The particle diameter of the pore-forming agent is usually 5 to 50 μm and preferably 15 μm or more.

[Mixture]

A mixture applied to the production method of the present invention is a mixture containing aluminum source powder, magnesium source powder, titanium source powder and silicon source powder as well as a pore-forming agent as described above, and in this mixture, the content of the pore-forming agent relative to the total 100 parts by mass content of the aluminum source powder, magnesium source powder, titanium source powder and silicon source powder is 5 to 30 parts by mass, preferably not more than 20 parts by mass.

When the elemental composition ratio of Al, Mg, Ti and Si in this mixture is represented by the above compositional formula (1), x satisfies $0.05 \leq x \leq 0.15$, preferably $0.06 \leq x \leq 0.13$, a satisfies $0 \leq a \leq 0.1$, preferably $0 \leq a \leq 0.05$ and b satisfies $0.05 \leq b \leq 0.15$, preferably $0.06 \leq b \leq 0.12$. In order to satisfy the above elemental composition ratio, the mixed amount of the aluminum source powder, magnesium source powder, titanium source powder and silicon source powder may be controlled appropriately.

This mixture usually further contains forming aids such as binders, plasticizers and dispersing agents, solvents and the like.

[Binder]

Examples of binders include celluloses such as methylcellulose, carboxylmethyl cellulose and sodium carboxylmethyl cellulose; alcohols such as polyvinyl alcohol; salts such as lignin sulfonate; waxes such as paraffin wax and microcrystalline wax; and thermoplastic resins such as EVA and liquid crystal polymer. The amount of the binder used is usually 1 to 20 parts by mass, preferably not more than 15 parts by mass relative to the total 100 parts by mass amount of the aluminum source powder, titanium source powder, magnesium source powder and silicon source powder.

Examples of plasticizers include alcohols such as glycerin; higher fatty acids such as caprylic acid, lauric acid, palmitic acid, arachic acid, oleic acid and stearic acid; and stearic acid metal salts such as Al stearate. The amount of the plasticizer used is usually 0.1 to 10 parts by mass, preferably 1 to 5 parts by mass relative to the total 100 parts by mass amount of the aluminum source powder, titanium source powder, magnesium source powder and silicon source powder. The above plasticizers also usually function as lubricants.

Examples of dispersing agents include inorganic acids such as nitric acid, hydrochloric acid and sulfuric acid; organic acids such as oxalic acid, citric acid, acetic acid, malic acid and lactic acid; alcohols such as methanol, ethanol and propanol; and surfactants such as polycarboxylic acid ammonium and polyoxyalkylene alkyl ether. The amount of the dispersing agent used is usually not more than 20 parts by mass, preferably 2 to 8 parts by mass relative to the total 100 parts by mass amount of the aluminum source powder, titanium source powder, magnesium source powder and silicon source powder.

As a solvent, for example, in addition to water, alcohols such as methanol, ethanol, butanol and propanol; and glycols such as propylene glycol, polypropylene glycol and ethylene glycol can be used. Particularly, water is preferred and in terms of less impurities, ion exchanged water is more preferably used. The amount of the solvent used is usually 10 to 100 parts by mass, preferably 20 to 80 parts by mass relative to the total 100 parts by mass amount of the aluminum source powder, titanium source powder, magnesium source powder and silicon source powder.

Such a mixture can be obtained by, for example, kneading aluminum source powder, magnesium source powder, titanium source powder, silicon source powder and a pore-forming agent with a binder, a plasticizer, a lubricant, a dispersing agent, a solvent and the like.

[Forming]

In the production method of the present invention, a molded body is obtained by forming such a mixture. In order to form a mixture, the mixture may be formed into a shape of target porous aluminum magnesium titanate by, for example, using the same forming apparatus such as a uniaxial press machine, an extruder, a tablet machine and a granulator as is usually used.

[Presintering]

The molded body obtained by forming is then presintered. Presintering is usually conducted by heating the molded body to a temperature of 200 to 900° C. The temperature may be kept constant or raised in the above temperature range during presintering. The pore-forming agent in the molded body is eliminated to form pores in the molded body by presintering the molded body. At the same time, forming aids such as binders, plasticizers, and dispersing agents and solvents are usually eliminated.

Presintering is usually conducted by using a usual heating apparatus such as a tube electric furnace, a box type electric furnace, a tunnel furnace, a far infrared rays furnace, a microwave oven, a shaft furnace, a reverberatory furnace, a rotary furnace, a roller hearth furnace and a gas burner furnace. Presintering may be conducted in a batch or continuous system. In addition, presintering may be conducted in a static or fluid system.

The time required for presintering may be sufficient time to eliminate the pore-forming agent contained in the molded body and it is usually 1 minute to 10 hours, preferably 1 to 7 hours.

Presintering may be conducted in the ambient atmosphere, but it is preferable to conduct it in an atmosphere with 0.1 mole % or less oxygen concentration since sudden elimination of the pore-forming agent can be inhibited.

[Sintering Process]

In the production method of the present invention, the molded body is sintered, after presintering it to eliminate the pore-forming agent. Sintering is usually conducted by raising the temperature of the molded body to the sintering temperature which is usually 1300 to 1560° C., preferably 1450 to 1530° C. without dropping the temperature of the molded body after presintering.

Though the temperature rising rate to the sintering temperature is not particularly limited, it is usually 1 to 500° C./hour. In case of silicon source powder being used, it is preferable to establish a process in which the temperature range of 1100 to 1300° C. is kept for 3 hours or more before the sintering process. This can facilitate melting and diffusion of the silicon source powder.

Sintering is usually conducted by using a usual sintering furnace such as a tube electric furnace, a box type electric furnace, a tunnel furnace, a far infrared rays furnace, a microwave oven, a shaft furnace, a reverberatory furnace, a rotary furnace, a roller hearth furnace and a gas burner furnace. Sintering may be conducted in a batch or continuous system. In addition, sintering may be conducted in a static or fluid system.

The time required for sintering may be sufficient time to react the aluminum source powder, magnesium source powder and titanium source powder in the molded body to form aluminum magnesium titanate and it is usually 10 minutes to 24 hours which can vary depending on the composition ratio of the mixture, the molded body volume, the sintering furnace form, sintering temperature and sintering atmosphere.

As described above, target porous aluminum magnesium titanate can be obtained. The porous aluminum magnesium titanate obtained is in the form almost keeping the molded body form. The porous aluminum magnesium titanate obtained can be processed by grinding and the like.

This porous aluminum magnesium titanate contains Si element and when its elemental composition ratio of Al, Mg, Ti and Si is represented by the above compositional formula (1), x satisfies 0.05≤x≤0.15, preferably 0.06≤x≤0.13, a satisfies 0≤a≤0.1, preferably 0≤a≤0.05 and b satisfies 0.05≤b≤0.15, preferably 0.06≤b≤0.12.

The porous aluminum magnesium titanate obtained according to the production method of the present invention can be suitably applied to, for example, sintering furnace jigs such as furnace materials; exhaust gas filters used in scavenging particulates contained in exhaust gas emitted from an internal-combustion engine such as a diesel engine and a gasoline engine to purify the exhaust gas [such as a diesel particulate filter]; porous catalyst supports used with the catalyst component loaded on their surfaces; filters used in filtration of food and drink such as beer; ceramics filters such as a selectively permeable filter to selectively permeate gas components produced on oil refinery, for example, carbon monoxide, carbon dioxide, nitrogen, oxygen and the like; and electronic components such as a substrate and a condenser. Particularly, when used as a ceramics filter, the porous aluminum magnesium titanate obtained according to the production method of the present invention can maintain good filter performance for a long period of time since it has large porosity.

EXAMPLES

The present invention will be described by Examples in more detail below.

Example 1

[Production of a Mixture]

Aluminum source powder, titanium source powder, magnesium source powder, silicon source power and the pore-forming agent below was mixed in the mass ratio shown below.

| | |
|---|---|
| (1) Aluminum source powder<br>Aluminum oxide powder (α-alumina powder) having the particle diameter corresponding to a cumulative percentage of 50% (D50) on a volume basis of 42 μm | 42.3 parts by mass |
| (2) Titanium source powder<br>Titanium oxide powder (rutile-form crystal) having D50 of 1.5 μm | 35.6 parts by mass |
| (3) Titanium source powder<br>Titanium oxide powder (rutile-form crystal) having D50 of 0.4 μm | 4.0 parts by mass |
| (4) Magnesium source powder<br>Magnesium oxide powder having D50 of 4 μm | 2.4 parts by mass |
| (5) Silicon source powder<br>Glass frit having D50 of 9 μm, containing Na, K, Mg and Al, their elemental composition ratio (in terms of oxide) being $Na_2O$: 8.6 mass %, $K_2O$: 5.9 mass %, MgO: 1.0 mass %, $Al_2O_3$: 11.5 mass %, $SiO_2$: 72.3 mass % (other impurity elements: 0.7 mass %) (melting point: 645° C.) | |
| (6) Pore-forming agent<br>Polyethylene powder having D50 of 20 μm | 12.2 parts by mass |

In the mixture obtained, the content of the pore-forming agent relative to the total 100 parts by mass content of the aluminum source powder, magnesium source powder, titanium source powder and silicon source powder is 13.9 parts by mass. In addition, when the elemental composition ratio of Al, Mg, Ti and Si in this mixture is represented by the above compositional formula (1), x is 0.12, a is 0.03 and b is 0.09.

The forming aids [binders and plasticizers] below as well as water were added to 100 parts by mass of the mixture obtained above in the mass ratio below and mixed.

| | |
|---|---|
| (7) Binder<br>Methylcellulose ("SM4000" manufactured by Shin-Etsu Chemical Co., Ltd) | 5.5 parts by mass |
| (8) Binder<br>Methylcellulose ("60SH4000" manufactured by Shin-Etsu Chemical Co., Ltd) | 2.4 parts by mass |
| (9) Plasticizer<br>Polyoxyethylene polyoxypropylene butyl ether ("50MB72" manufactured by NOF CORPORATION) | 4.64 parts by mass |
| (10) Plasticizer<br>Glycerin | 0.4 parts by mass |
| (11) Ion exchanged water | 30.7 parts by mass |

[Forming]

The mixture obtained was kneaded and extruded for forming through a mixing extruder to obtain a molded body having a cylindrical profile with a diameter of 30 mm and a height of 50 mm, and in the form of honeycomb having a large number of continuous holes in the height direction and a cell wall thickness of 0.3 mm.

[Presintering]

This molded body was placed in a heating furnace and its temperature was gradually raised so that all moisture was volatilized below 200° C. and the pore-forming agent [polyethylene powder], binders [methylcellulose] and plasticizers [polyoxyethylene polyoxypropylene butyl ether and glycerin] were all eliminated below 900° C.

[Sintering]

Heating was continued at the same temperature rising rate continuously after presintering to 1450° C., and the same temperature was kept for 5 hours to conduct sintering to obtain porous aluminum magnesium titanate in the form of honeycomb. This porous aluminum magnesium titanate had porosity of 42.5%.

The mixture obtained above was formed under the same operation as above, the obtained molded body was presintered under the same operation as above, and sintered under the same operation as above except that sintering temperature was 1550° C. to obtain porous aluminum magnesium titanate in the form of honeycomb. This porous aluminum magnesium titanate had porosity of 35.8%.

Example 2 and Comparative Examples 1 to 2

Porous aluminum magnesium titanate was obtained under the same operation as in Example 1 except that the amount of aluminum source powder, titanium source powder, magnesium source powder, silicon source powder and the pore-forming agent and forming aids [binders and plasticizers] as well as water used was as shown in Table 1 below. The porosity of the porous aluminum magnesium titanate obtained is shown in Table 1 below.

TABLE 1

|  | Example 1 | Example 2 | Comparative Example 1 | Comparative Example 2 |
|---|---|---|---|---|
|  | (parts by mass) | | | |
| Aluminum source powder | 42.2 | 44.3 | 40.2 | 37.2 |
| Titanium source powder (rutile-form crystal) | 35.6 | 34.5 | 36.8 | 38.7 |
| Titanium source powder (rutile-form crystal) | 4.0 | 3.8 | 4.1 | 4.3 |
| Magnesium source powder | 2.4 | 1.6 | 3.2 | 4.1 |
| Silicon source powder | 3.6 | 3.6 | 3.5 | 3.5 |
| Pore-forming agent | 12.2 | 12.2 | 12.2 | 12.2 |
| Binder (SM4000) | 5.5 | 5.5 | 5.5 | 5.5 |
| Binder (60SH4000) | 2.4 | 2.4 | 2.4 | 2.4 |
| Plasticizer (50MB72) | 4.6 | 4.6 | 4.6 | 4.6 |
| Plasticizer (glycerin) | 0.4 | 0.4 | 0.4 | 0.4 |
| Ion exchanged water | 30.7 | 31.9 | 31.7 | 29.6 |
| x | 0.12 | 0.08 | 0.16 | 0.24 |
| a | 0.03 | 0.03 | 0.03 | 0.03 |
| b | 0.09 | 0.09 | 0.09 | 0.09 |
| Porosity (1450° C.) | 42.5% | 40.4% | 38.6% | 34.1% |
| Porosity (1550° C.) | 35.8% | 41.0% | 29.8% | 22.8% |

Industrial Applicability

As described above, according to the production method of the present invention, porous aluminum magnesium titanate having larger porosity can be produced.

The invention claimed is:

1. A method for producing porous aluminum magnesium titanate, comprising:

forming a mixture containing aluminum source powder, magnesium source powder, titanium source powder and silicon source powder as well as a pore-forming agent to obtain a molded body;

presintering the obtained molded body to eliminate the pore-forming agent; and then sintering the presintered molded body to react the aluminum source powder, magnesium source powder and titanium source powder, wherein a content of the pore-forming agent in the mixture relative to a total 100 parts by mass content of the aluminum source powder, magnesium source powder, titanium source powder and silicon source powder is 5 to 30 parts by mass, a melting point of the silicon source powder is 600 to 1300° C., when an elemental composition ratio of Al, Mg, Ti and Si in the mixture is represented by compositional formula (1):

$$Al_{2(1-x)}Mg_xTi_{(1+x)}O_5 + aAl_2O_3 + bSiO_2 \qquad (1),$$

x satisfies $0.05 \leq x \leq 0.15$, a satisfies $0 \leq a \leq 0.1$ and b satisfies $0.05 \leq b \leq 0.15$, the presintered molded body is sintered at 1300 to 1560° C., and the particle diameter corresponding to a cumulative percentage of 50% (D50) on a volume basis of the aluminum source powder is within the range of 20 to 60 μm.

* * * * *